(No Model.)

M. DOUGANS.
GALVANIC BATTERY.

No. 406,636. Patented July 9, 1889.

Witnesses
J. R. Barton
Ella P. Blenus

Inventor
Matthew Dougans
By Chas. H. Burleigh
Attorney

UNITED STATES PATENT OFFICE.

MATTHEW DOUGANS, OF WORCESTER, MASSACHUSETTS, ASSIGNOR OF ONE-HALF TO EDWARD P. KING, OF SAME PLACE.

GALVANIC BATTERY.

SPECIFICATION forming part of Letters Patent No. 406,636, dated July 9, 1889.

Application filed March 14, 1889. Serial No. 303,202. (No model.)

*To all whom it may concern:*

Be it known that I, MATTHEW DOUGANS, a citizen of the United States, residing at Worcester, in the county of Worcester and State of Massachusetts, have invented certain new and useful Improvements in Electric Batteries, of which the following, together with the accompanying drawings, is a specification sufficiently full, clear, and exact to enable persons skilled in the art to which this invention appertains to make and use the same.

The object of my present invention is to provide an efficient and durable electrical battery, having a paste filling of improved composition, constructed or put up in convenient form for portability, market, and use; also, to provide, in a battery, means for the absorption or prevention of the deleterious action of the hydrogen or gas on the carbon. These objects I attain by the means herein described, the particular subject-matter claimed being hereinafter definitely specified.

Figures 1, 4:
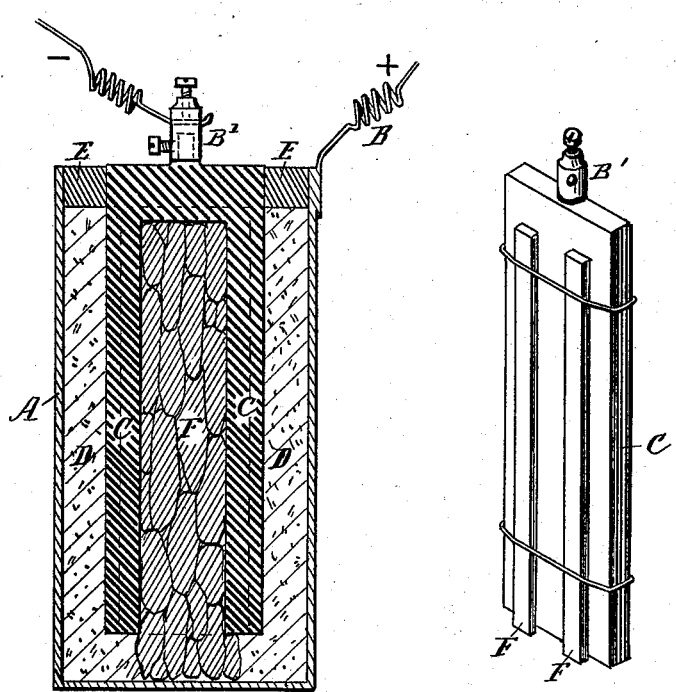
Figure 2:
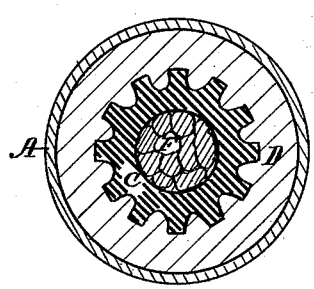
Figure 3:
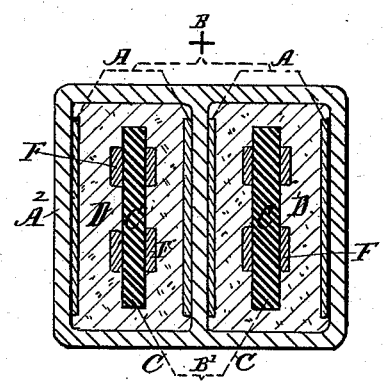

In the drawings, Figure 1 is a vertical section of a battery made in accordance with my invention. Fig. 2 is a horizontal section of the same. Fig. 3 is a horizontal section of my improved battery as made with flat carbons, also with a double cell, and with the cup or receptacle of neutral material. Fig. 4 is a perspective view of the flat carbon with gas-absorbing strips thereon.

Referring to parts, A denotes the zinc or positive element, which can be arranged to form the receptacle or cup within which the other parts are contained, or be used as a lining within a cup or receptacle of neutral material.

C indicates the carbon or negative element, which can be cylindrical, as in Figs. 1 and 2, or flat, as in Figs. 3 and 4, or other shape, as most convenient or desirable.

B B' indicate the binding-posts or electrode-connections, of usual form, on the carbon and on the zinc.

D indicates the excitant-filling, which consists of a paste or plastic mass composed of the following named substances, in about the proportions specified, viz: pulverized madder, three ounces; sal-ammoniac, eight to nine ounces; sulphate of zinc, one-fourth to one ounce; bichloride of mercury, one-fourth ounce; water, (preferably used hot,) fourteen fluid ounces. These ingredients may be somewhat varied in quantity within a reasonable limit without departing from the nature of my invention. For instance, if batteries are desired to give an intense current for working induction-coils, a greater proportion of zinc sulphate can be used; or if batteries are to give less intense action and have longer life, as for bell-ringing and similar uses, then a less proportion of zinc sulphate can be used.

In preparing the excitant filling or paste, the bichloride of mercury is best dissolved in boiling water. The other ingredients are mixed in powdered form, and the water containing the bichloride of mercury is added thereto for moistening the mass.

The madder serves as a carrier or body for holding the moisture supporting the other ingredients properly distributed throughout the mass and in effective working condition.

When forming the battery, the carbon C is inserted within the cup, leaving a space of about three-fourths of an inch (more or less) between the carbon and zinc, and this intervening space is filled with the paste, which may be made of a consistency about the same as ordinary mortar. When the space is filled with the paste, the top of the cup is closed or hermetically sealed by means of asphaltum, paraffine, wax, or other like substance, as at E.

F indicates pieces of vegetable or wood charcoal placed in contact with the carbon to serve as an absorbent for the hydrogen or gas generated in the decomposition of the zinc, or to prevent the deleterious effects produced by said gas settling upon the surface of the carbon and thereby interfering with the proper and efficient working of the battery.

If desired, the cup or receptacle can be made of a neutral material—as, for instance, of indurated fiber, paper-pulp, straw-board, wood, or other substance; if of paper or other pervious material, saturated with paraffine, tar, or asphaltum, &c.

Flat carbons can be employed, if desired, in which case the battery-cup $A^2$ is best shaped as in Fig. 3, preferably with two cells in the same cup. The zinc A in this case is used as a plate or lining within and adjacent to the inner surface of the cup, the wood-charcoal F being best applied to the exterior of the carbon in strips, as shown in Fig. 4, and secured thereto in any convenient suitable manner. The excitant-filling and other features of construction in this form are substantially the same as above described, and shown in Fig. 1.

I am aware that batteries have heretofore been made in which the excitant-filling is of plastic consistency; but, so far as I am aware, all such are of essentially different composition from that employed by me, and herein described and claimed.

What I claim as my invention, to be secured by Letters Patent, is—

1. The excitant-paste for batteries, composed of madder, sal-ammoniac, sulphate of zinc, bichloride of mercury, and water, mixed together in proportions substantially as specified.

2. The excitant composition formed of madder, sal-ammoniac, sulphate of zinc, bichloride of mercury, and water, substantially as described, in combination with the zinc and carbon elements in an electric battery, substantially as set forth.

3. The combination, with the carbon or negative element, the positive element, and the excitant-filling, in an electric battery, of pieces of wood-charcoal disposed in contact with the carbon or negative element for absorbing and condensing hydrogen.

4. The combination, in an electric battery, of the zinc A, the carbon C, the excitant material or paste D, composed of madder, sal-ammoniac, sulphate of zinc, bichloride of mercury, and water, as specified, and wood-charcoal F, for absorbing hydrogen, all substantially as and for the purpose set forth.

5. A battery composed of the double-cell cup of indurated fiber or neutral material, with a zinc lining, a carbon center having a filling or re-enforce of wood-charcoal, and an intervening filling between said zinc and carbon, of excitant-paste composed of madder, sal-ammoniac, sulphate of zinc, bichloride of mercury, and water, substantially as set forth.

6. An electric battery having or containing pulverized madder, in combination with the excitant agents, substantially as and for the purpose set forth.

Witness my hand this 11th day of March, A. D. 1889.

MATTHEW DOUGANS.

Witnesses:
    CHAS. H. BURLEIGH,
    EDW. P. KING.